(No Model.) 4 Sheets—Sheet 1.
J. RADERMACHER.
POTATO HARVESTER.
No. 555,401. Patented Feb. 25, 1896.
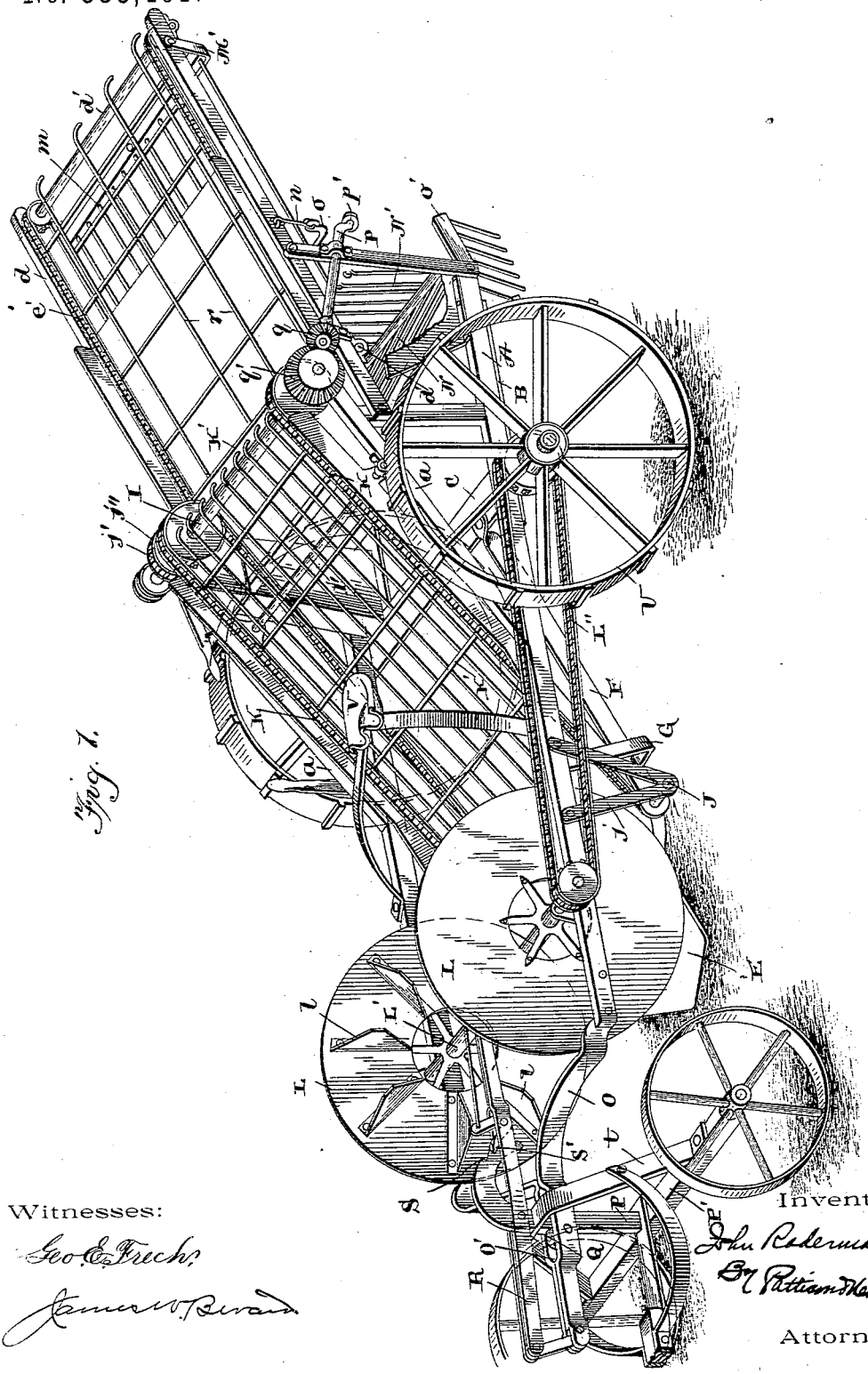
Witnesses:
Geo. E. Frech.
James W. Berard
Inventor.
John Radermacher
By Pitman & Hecht,
Attorneys.

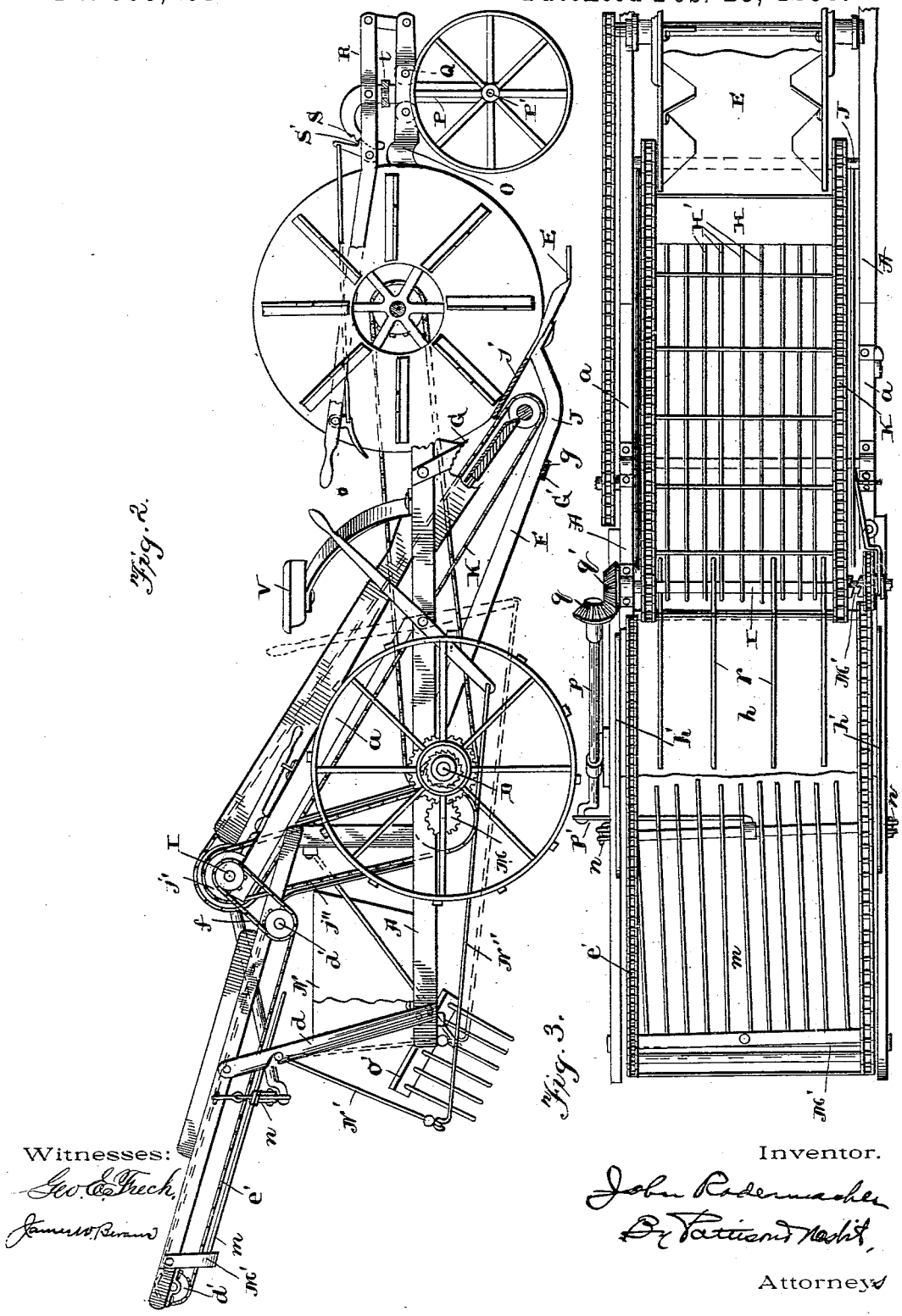

(No Model.) 4 Sheets—Sheet 3.
J. RADERMACHER.
POTATO HARVESTER.

No. 555,401. Patented Feb. 25, 1896.

Witnesses:
Geo. E. Frech
James W. Berard

Inventor.
John Radermacher
By Patterson & Nesbit
Attorneys (No Model.) 4 Sheets—Sheet 4.
J. RADERMACHER.
POTATO HARVESTER.
No. 555,401. Patented Feb. 25, 1896.
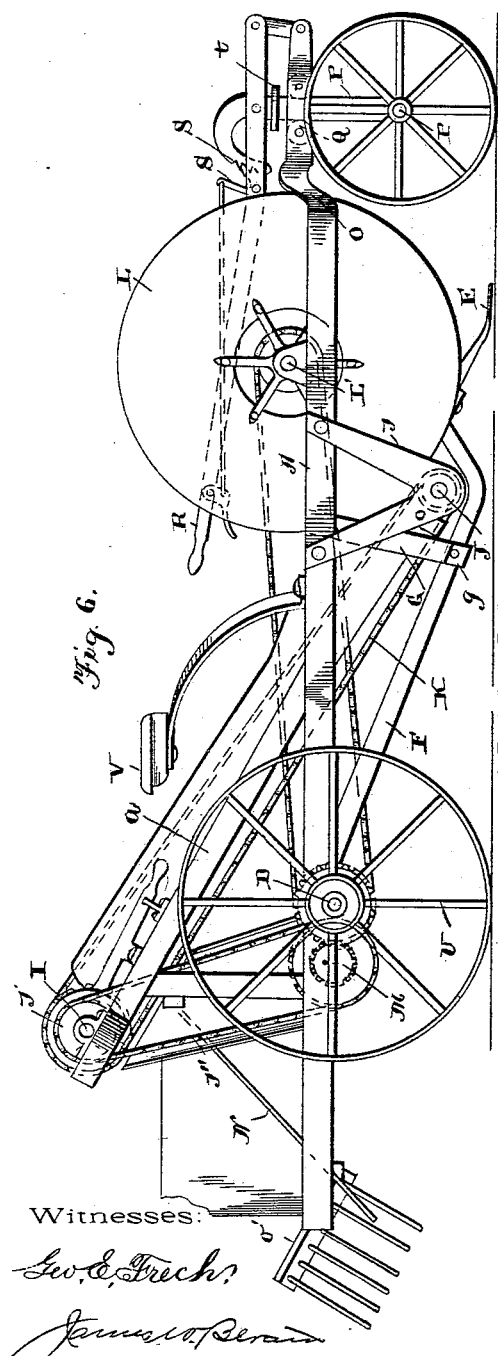
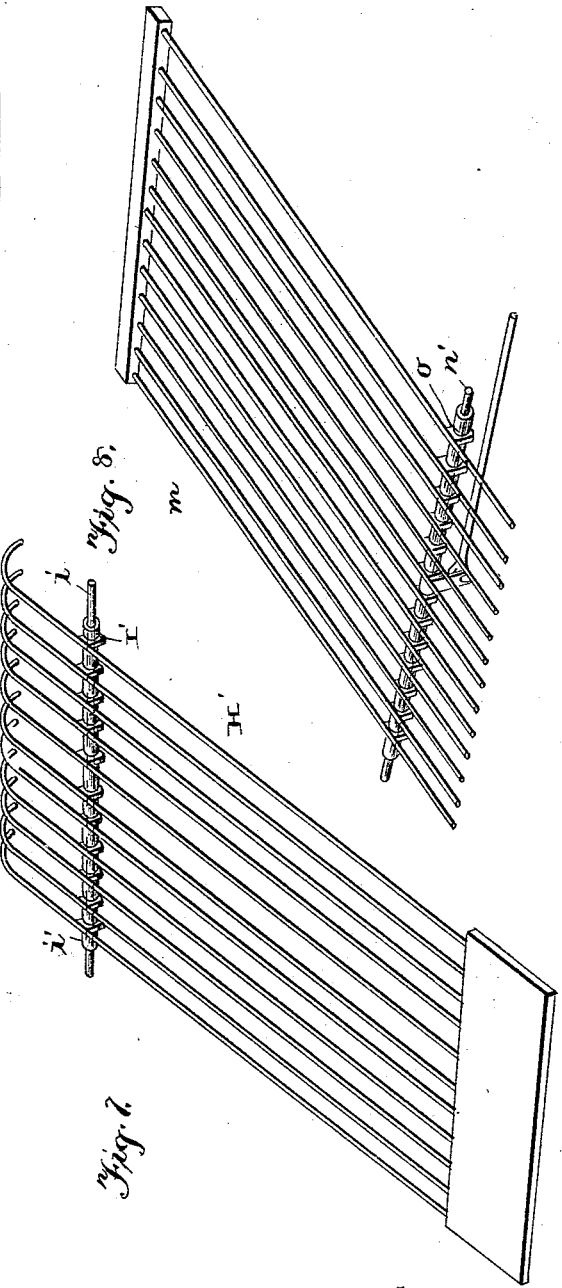
Witnesses:
Geo. E. Frech.
James W. Beran
Inventor.
John Radermacher
By Pattison & Nesbit
Attorneys

UNITED STATES PATENT OFFICE.

JOHN RADERMACHER, OF KAUKAUNA, WISCONSIN.

POTATO-HARVESTER.

SPECIFICATION forming part of Letters Patent No. 555,401, dated February 25, 1896.

Application filed April 11, 1895. Serial No. 545,371. (No model.)

*To all whom it may concern:*

Be it known that I, JOHN RADERMACHER, of Kaukauna, in the county of Outagamie and State of Wisconsin, have invented certain new and useful Improvements in Potato-Harvesters; and I do hereby declare the following to be a full, clear, and exact description of the invention, such as will enable others skilled in the art to which it pertains to make and use it, reference being had to the accompanying drawings, which form part of this specification.

My invention relates to an improved potato-harvester; and the object of the same is to provide a machine of improved construction for digging and elevating the potatoes and separating them from the ground, and finally discharging them in a suitably-formed receptacle carried by the harvester, which may be dumped at intervals as desired, or which may be done away with as a receptacle and simply serve as a guide for directing the potatoes back to the surface of the ground behind the machine.

A further object is to provide improved guides for assisting the upward movement of the potatoes and earth on the digging-plow to the elevator.

A further object is to provide an improved front truck mechanism for the harvester.

A further object is to provide an improved supplemental frame carried by the rear truck for supporting the framework of the harvester.

Other advantages and objects attained by the novel combination and arrangement of parts constituting the invention will be fully shown and described hereinafter and illustrated by the accompanying drawings, in which—

Figure 4:
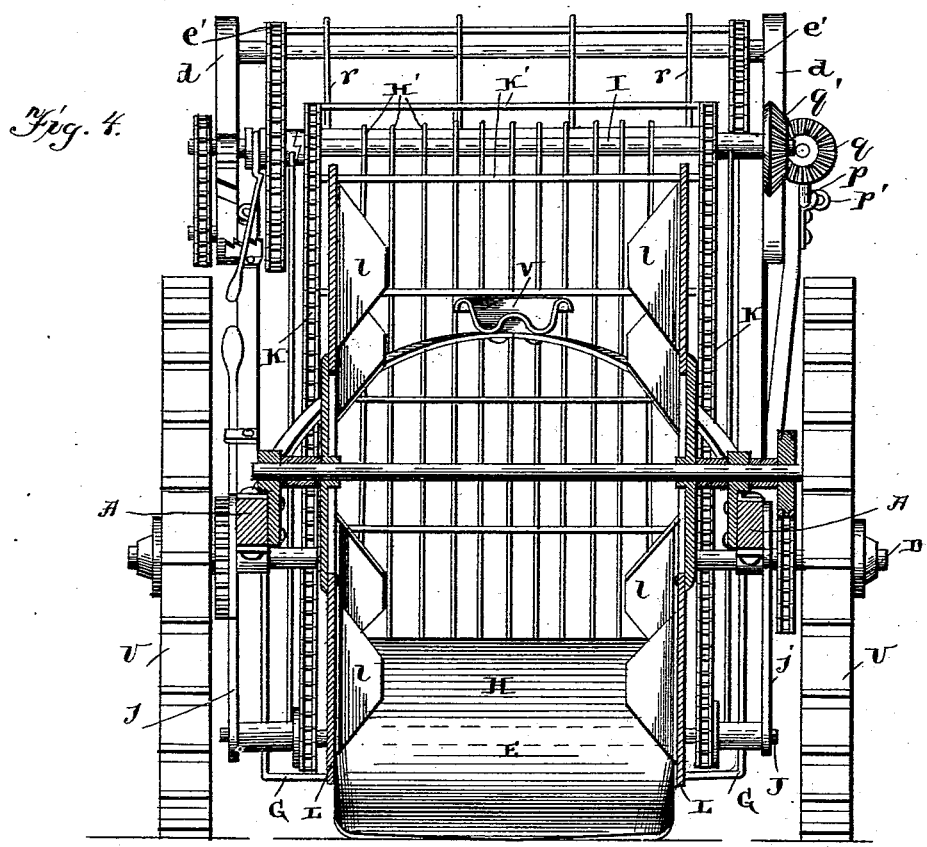
Figure 5:
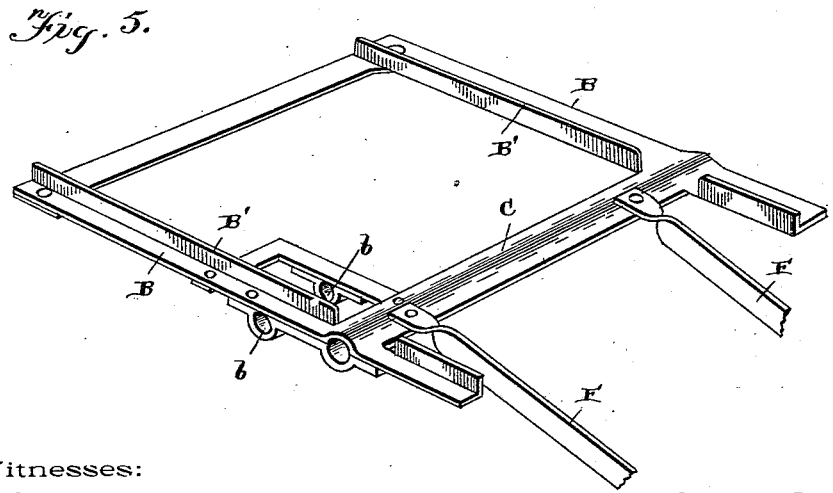

Figure 1 is a perspective view of the harvester. Fig. 2 is a side elevation of the same, taken from the reverse side of the machine shown in Fig. 1. Fig. 3 is a plan view. Fig. 4 is a vertical cross-sectional view on line 4 4 of Fig. 2. Fig. 5 is a detail of the supporting-frame on the rear axle. Fig. 6 is an elevation of the machine with the rear elevator and sifter dispensed with. Fig. 7 is a detail view of the longitudinal guides over which the potatoes are elevated from the plow. Fig. 8 is a similar view of the sieve beneath the rear elevator.

A designates the main longitudinal beams of the harvester-frame, supported on and suitably secured to the parallel arms B of the supplemental frame illustrated in Fig. 5, the same having the integral transverse upwardly-bowed cross-bar C, which covers the rear axle D, the frame having suitable bearings upon its under side, as shown, for the accommodation of the said axle. The frame serves as a substantial support and connection between the axle and the main harvester-frame. The edges of arms B are turned upward at B', so as to enable beams A to fit snugly thereto.

E is the plow or digger supported in the position shown by the upwardly-inclined rearwardly-extending arms F, secured at their rear ends to cross-bar C. Behind the plow the arms F are supported beneath beams A by the depending yoke G, having on its transverse bar the depressed loops or sockets G', in which arms F are bolted, as indicated at $g$, and thus the frame and plow are fastened securely together.

The rear end of the plow extends backward at an upward incline, and arranged slightly beneath the same and at about the same angle as the plow is the floor or bottom H, and secured near the upper edge of the latter are the upwardly-inclined guiding-fingers H', which at their upper ends extend over the elevator-shaft I. Said last-named shaft and shaft J, supported by brackets $j$, constitute the carrier for the endless elevator K, which passes upward between the floor or bottom H and the plow E and over the finger-guides I.

The elevator consists of the endless chain provided with the transverse bars K', which serve to lift the potatoes, or rather slide them up over the said fingers, the latter serving to allow the dirt to drop therefrom, as will be understood. It will be understood from the description and drawings that the said elevator takes the product directly from the rear end of the plow as the latter and the elevator overlap, as shown. In fact the floor H and plow E constitute a shovel having the interruption for the admission of the elevator, and the object of this arrangement is to have a long upward extent of shovel-surface, so that the elevator will not work directly down in the ground when the plow is in operation and become clogged, and thus the work is accomplished in a most effective and complete manner.

For the purpose of elevating the potatoes and ground from the plow to the endless elevator or carrier I provide the vertical rotary disks L, one on each side of the plow, the same mounted on shafts L' journaled to beams A and actuated by endless chain L'', extending from a sprocket on rear axle D, as shown. The disks L are provided on their adjacent surfaces with the angular lips or guides $l$, which extend over the top surface of the shovel or digger and serve to work the potatoes and dirt backward and upward on the latter until the endless elevator and carrier is reached. The fingers I are provided with the depending perforated lugs I', Fig. 7, through which extends the transverse bar or bolt $i$, carrying the washers $i'$ between the finger-lugs, so as to hold the fingers the proper distance apart. It will be understood that by inserting either long or short washers the fingers may be adjusted to the desired distance apart and there securely held.

Shaft J is suitably journaled in framework $a$, supported on beams A, and arranged loose on said shaft is the sprocket $j$, around which passes the endless chain $j'$ from driving-gear M, for which bearings $b$ are formed in the supplemental framework B, the said gearing being suitably connected to a driving-gear on axle D. Sprocket $j$ is secured to and thus made to rotate shaft J by clutch M', arranged as shown. Thus it will be seen that sprocket $j$ turns at all times on shaft J when the machine is not in operation, the said sprocket being actuated by the chain-and-gear connections with the main axle of the machine, while when it is desired to actuate the elevator the same is thrown in operation by the movement of the clutch just described.

A framework $d$ is extended upward and rearward from the rear end of the harvester-frame, and journaled adjacent its ends are the sprocket-carrying shafts $d'$, about which passes the endless elevator or carrier $e$, the inner one of shafts $d'$ being actuated by the chain $f$ extending to a sprocket on shaft J.

Arranged in frame $d$ and extending backward a considerable portion of its length is the solid bottom $h$ provided with upwardly-turned sides $h'$, and on this bottom the potatoes are deposited by the elevator leading backward from the plow. The rear end of the carrier $e'$ passes over the said solid-bottom surface and serves to draw the potatoes upward thereon, from which they drop to the vibratory screen $m$, which is pivotally secured at its upper rear end to yoke M' depending from frame $d$, while the lower forward end thereof is hung upon the swinging links $n$. The fingers composing this vibratory screen are preferably secured to the rear bar, Fig. 8, while their forward ends are adjustable with relation to each other, the same being formed with the depending perforated lugs which are threaded upon the bolt or rod $n'$, and between which are interposed the washers $o$, which may be varied in length to hold the fingers the desired distance apart. The crank-shaft $p$ is connected by rod $p'$ to the sieve for the purpose of vibrating it, the said crank-shaft being suitably journaled to the frame and provided at its upper end with the bevel-gear $q$, meshing with the similar gear $q'$ on the end of shaft J. Thus it will be seen that after the potatoes are dug they are elevated, and through the several operations described the small dirt and other refuse is effectually removed therefrom, so that they are substantially free from foreign matter when they leave the harvester. Fingers $r$ extend longitudinally rearward over the entire rear elevator, over which the vines or weeds dug by the harvester are passed and discharged over the rear end of the machine.

The sieve $m$ discharges the potatoes into the receptacle N formed of the downwardly-inclined wire bottom, as shown, and provided with the gate N' suitably swung at its upper edge in frame $d$ and adapted to be operated by rod N'' leading forward to the hand-lever fulcrumed to beam A within easy reach of the operator. By means of this arrangement when the gate is opened the potatoes will slide from the receptacle into piles upon the ground automatically, owing to the inclined bottom of the receiver. The piles may thus be made at regular intervals the desired distance apart. A guard $o'$ arranged at one side of the discharge of the receptacle and inclined inward serves to throw the potatoes from the wheel-track, so as to be out of the way when the machine is moving in a reverse direction.

The machine described and illustrated above is adapted for work in loose or sandy ground; but for a stiff clay soil it is my purpose to dispense with the rear elevator and the receptacle, as when working in such a soil it is not desirable to endeavor to separate the potatoes from the stiff clods, and therefore the potatoes are discharged directly back of the harvester from the first elevator, the machine in such construction being of the form illustrated in Fig. 6.

The front truck of the harvester consists of the inwardly and forwardly extending arms O projected from the forward end of beam A. The said arms are brought together, but are separated for a short distance to form a vertical pocket or guide O', through which extends the standard P from axle P'. In pocket O' are the friction-rollers Q, so as to render the vertical movement of arms O on standard P very easy. The double lever R is fulcrumed between its ends to standard P and connected by link R' to the outer ends of arms O, so that a depression of the inner end of lever R will serve to raise arms O and the frame of the harvester with relation to the front truck, while the release of the said rear end of lever R will permit the harvester-frame to drop and bring the plow in engagement with the ground. The upper end of standard T is curved backward, as shown, and provided with the notches S, which are adapted to be engaged by the dog S' on lever R, which serves to hold the parts at the desired adjustment.

The post T is supported in a vertical position by the lateral braces $t$ extending to axle T', and from the braces $t$ extend the connections leading to the pole for drawing the harvester. The drive-wheels U are mounted on axle D and provided with a tooth connection, as in Fig. 2, so that when the harvester is moving forward the same will be set in operation by the rotation of the axle with the drive-wheel, while in a backward movement of the harvester the wheels will turn freely on the axle. The clutch-operating lever, the lever for controlling the potato-receptacle at the rear of the machine, and the lever for regulating the vertical adjustment of the harvester are all within easy reach and access of the driver and operator occupying the seat V, so that the harvester is readily manageable by one man.

Having thus fully described my invention, what I claim as new, and desire to secure by Letters Patent, is—

1. The combination with the harvester-frame and operating mechanism, of the rear axle upon which the same is supported, the supplemental frame provided with the parallel arms for supporting the main frame of the machine, the cross-bar in said supplemental frame for protecting the axle, substantially as shown and described.

2. An improved potato-harvester comprising a frame, the rear axle upon which the same is supported, a transverse protector therefor secured to the frame, the forwardly-extending arms secured at the rear ends of said protector, the digger supported by the forward ends of the arms, and an operating mechanism, substantially as shown and described.

3. An improved potato-harvester comprising the frame, a yoke extending therefrom provided with depressions, the digger, the arms for supporting the same confined in the depressions of the yoke, and secured at their rear ends to the frame, substantially as shown and described.

4. In a potato-harvester, the combination of a digger, an elevator to the rear thereof, the vertically-arranged revoluble disks—one on each side of and adjacent the digger, the lips on the adjacent surfaces of the disks which rotate over the surface of the digger, and an operating mechanism for the elevator and the disks, substantially as shown and described.

5. The combination of the beams A of the harvester-frame, the inwardly-extending arms connecting the forward ends of the beams, the vertical pocket arranged between said arms, the friction-rollers in said pocket, the forward truck, the post arranged vertically thereon and extending between the friction-rollers, the operating-lever fulcrumed to the post and connected to the frame, and a means for holding the lever at the desired adjustment, substantially as shown and described.

6. The combination of the main frame of the harvester, the forward truck, the post arranged thereon, upon which the forward portion of the frame is adapted to move vertically, the lever fulcrumed to the post and connected by the link to the frame, the notched holder formed by bending backward the upper extremity of the post, and the dog carried by the lever which is adapted to engage the said notched holder, substantially as shown and described.

In testimony whereof I affix my signature in presence of two witnesses.

JOHN RADERMACHER.

Witnesses:
C. H. L. HAMER,
S. C. GARVEY.